Figure 1:
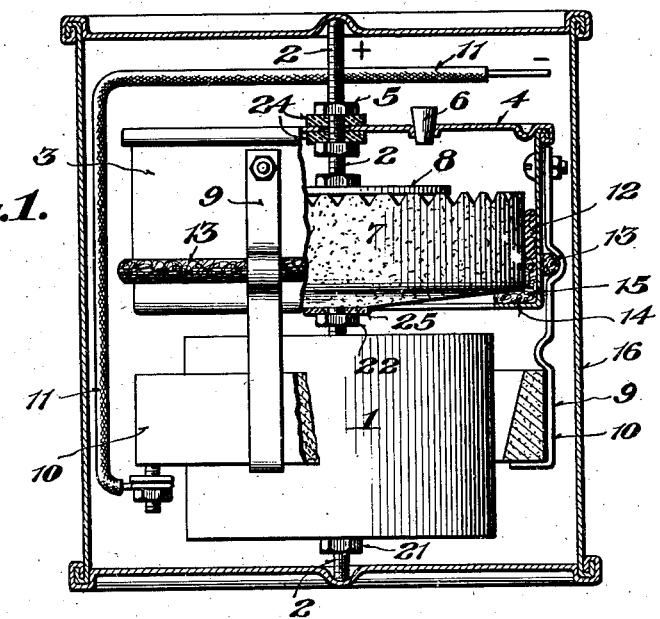

Sept. 17, 1935.　　　M. L. MARTUS ET AL　　　2,014,856

SEALED CELL REPLACEMENT

Filed April 11, 1932

Inventors
Martin L. Martus,
Edmund H. Becker,

By K. P. McElroy
　　　Attorney

Patented Sept. 17, 1935

2,014,856

UNITED STATES PATENT OFFICE 2,014,856

SEALED CELL REPLACEMENT

Martin L. Martus, Woodbury, and Edmund H. Becker, Waterbury, Conn.

Application April 11, 1932, Serial No. 604,542

19 Claims. (Cl. 136—86)

This invention relates to sealed cell replacements; and it comprises as a new manufacture a sealed replacement for electric cells of the alkaline type, said replacement comprising a zinc electrode, a depolarizing electrode and a fused cake of caustic alkali in spaced assemblage, oil contained in an absorbent body mounted on the assemblage and an air-tight casing surrounding and sheathing the whole, said replacement being adapted on removal of the casing and immersion in water to give an operative cell with a body of alkaline electrolyte surmounted by a floating cover of oil; all as more fully hereinafter set forth and as claimed.

The most common types of electric cells employing an alkaline electrolyte are provided with zinc anodes, suspension usually being from the cover of the cell container. The cathode is usually a body of copper oxid although air depolarized electrodes are beginning to be viewed with favor. The electrolyte commonly carries a floating cover of oil in order to prevent the caustic alkali taking up $CO_2$ from the air, to avoid loss of water by evaporation and to avoid creeping of alkali salts. The oil cover is an important part of the assemblage. A non-volatile, liquid petroleum oil is usually employed.

These cells are rarely used singly, being generally placed in a battery, frequently of many units. The body of electrolyte for each cell is usually made up just before use, the right amount of caustic alkali being dissolved in water to make a solution and this solution then being covered with oil. This necessitates an individual jar or bottle of oil for each cell and a separate one of caustic alkali. The latter must be kept wholly protected against air till the moment of use.

In Patent 1,579,558, on which the present invention in some of its aspects is an improvement, is described an alkaline type cell, adapted to function as an active cell upon adding water to dissolve a supply of dry caustic contained in the cell. This cell has a glass cell jar, provided with a top cover from which the electrodes are suspended, and through which electrical connections pass, a corked orifice is provided in the cover for filling the jar with water. Addition of water gives an active cell, of excellent electrical properties.

There is a demand, however, for replaceable parts for the above type of cell. A desideratum has been a cell and container from which the electrolyte and electrodes could be readily removed when exhausted and replaced with fresh materials. A single replacement unit is desired; something which can be stored indefinitely without deterioration, and which can be slipped into the container, water added and a functioning cell at once produced. The usual 3-package assemblages do not satisfactorily meet this demand; they are inconvenient in shipping and storage and their use involves too much manipulation. It is not always certain that the alkali packet will remain with the other packages.

In the present invention there is provided a simple and economical replacement unit which can be shipped readily and can be stored indefinitely without deterioration. This replacement consists of a zinc anode and a depolarizing cathode spaced apart and rigidly secured together by insulating means and provided with the usual electrical leads; the whole being adapted to enter the standard jar or cell compartment of a battery and to be attached to and supported by the cell cover. Firmly secured to this assemblage near the lower end is a cake of fused caustic alkali; while at a higher point is a body of absorbent material containing the amount of oil necessary in a cell. As so far described, the replacement, upon placing in a cell compartment containing water, will at once give an operative and functioning cell. The caustic soda dissolves and forms the electrolyte while the oil in the absorbent is displaced by the electrolyte and floats up to the top to form a cover. The replacement may be simply secured to the top of a cell container containing some water, electrical connections made and there will be at once a functioning cell. The replacement assemblage as so far described however will not withstand the action of air; the caustic alkali cake will deliquesce rapidly and react with the carbon dioxid of the air. This cake must be sealed from air. The assemblage is therefore provided with an air-tight sheath or casing of some kind, mechanically strong enough to stand handling, shipping and storage but of a character permitting easy removal when the replacement is wanted. The cake of caustic alkali may be hermetically sealed independently, if desired. Glass jars can be used but it is usually difficult to make sufficient air-tight a glass jar of the type adapted to receive the replacement. Metal or hard rubber compositions can be employed. An ordinary sealed metal can is suitable and this is employed in an advantageous embodiment of this invention.

In the accompanying illustration there is shown more or less diagrammatically an embodiment of the present invention employing an air depolarized cathode. The structure is much the same when a copper oxide cathode of the type employed in the ordinary Lalande cell is used.

Figure 2:
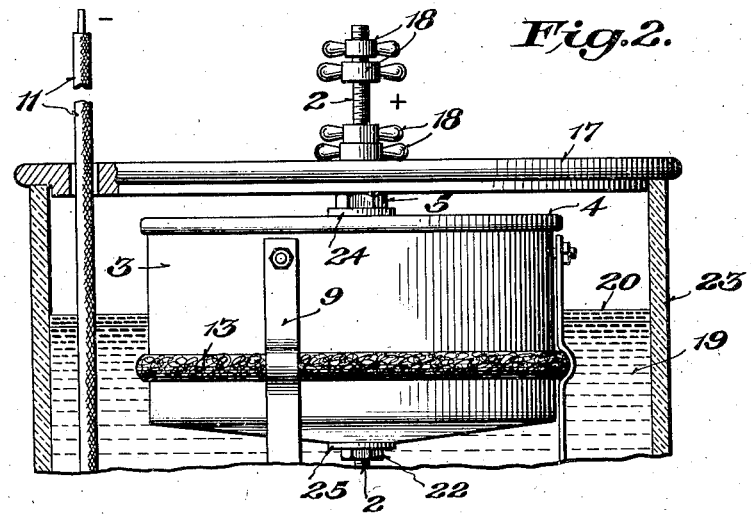
Figure 3:
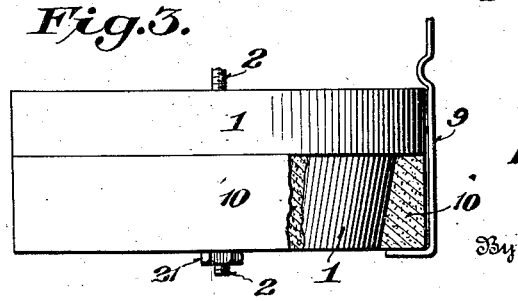

Fig. 1 is a view partly in vertical section and partly in elevation of a complete packaged replacement, Fig. 2 is a partial sectional view of the replacement with the casing removed, mounted in an ordinary cell and after the addition of water, while Fig. 3 is a partial view showing a modification with a cake of caustic alkali molded around the zinc electrode.

Fig. 1, element 1 is a cake of caustic alkali. It may be made of caustic soda with an admixture of caustic potash; or it may be a cake of caustic soda perforated or otherwise given greater surface and thereby a quicker rate of solution.

The caustic alkali cake is mounted on an axial rod, 2; the upper end serving as positive pole when the cell is functioning. The nut 21 is employed to support the caustic from below. Metal annulus or sleeve 3 is held by a disk-like support and cover 4 which may be of metal, locked to the axial rod by lock nuts 5 and insulating bushings at 24. As shown, this cover is provided with an air-hole closed by cork 6. The axial rod 2 engages and is placed in electrical contact with depolarizing electrode 7 by element 8. Insulating bushings 24 and 25 are provided to keep the rod out of electrical contact with the sleeve. The corrugated upper surface of the carbon electrode 7 permits the passage of air beneath the disc 8 as well as offering a greater contact surface with the air above this electrode.

Depending from the metal annulus 3 but out of electrical contact therewith are straps 9 supporting an annular zinc electrode 10 at three points. Secured to the zinc is insulated wire 11, serving as the negative lead of the cell. The walls of the metal sleeve 3 are impermeable to liquid and are separated from the depolarizing electrode 7 by pitch layer 12, which prevents capillary creeping of the solution on the surface of the carbon. This seal advantageously projects both above and below the effective surface of the electrolyte in the finished cell. Located in close relation to the surface of the electrolyte and held between the sleeve 3 and the electrode-supporting straps 10, is a porous tube 13 which may be cheesecloth filled with cotton or the like and soaked in oil; the amount of oil being that sufficient to furnish a floating oil layer over the electrolyte of the cell when functioning. The bottom of the metal sleeve 3 extends inward as a flange 14, serving to support the depolarizing electrode from below. A layer of cotton 15 may be interposed to prevent any particles of carbon from the electrode 7 from depositing on the zinc electrode 10. The bottom of the carbon electrode is advantageously convex downwards as shown in order to prevent the accumulation of gas bubbles beneath the electrode. The flange 14 is usually provided with slots, not shown, in order to allow the escape of any such bubbles. In effect the metal sleeve 3, the flange 14 and the cover 4 form an opened-bottomed receptacle for holding the depolarizing electrode 7, an air space being left between the electrode and the top 4.

As shown, the depolarizing electrode 7 is an air-replenished activated carbon block; but in many assemblages under the present invention a body of copper oxid or other depolarizer can be used. The activated carbon may contain a small amount of distributed lubricating oil to prevent the capillary plugging of the pores by electrolyte, as described in our prior Patent No. 1,673,198.

As shown in Fig. 1, the whole assemblage may be enclosed in an air-tight casing; a sealed container 16 being used. The axial rod 2 extends both above and below the assemblage and enters corresponding centering depressions in the container top and bottom. The whole forms a convenient one-package unit containing not only the electrical parts but also the alkali and the oil necessary in using the assemblage as a replacement. The nuts 5, 21 and 22, as well as the straps 9 hold the complete unit in rigid spaced assemblage. The alkali and the oil are fixedly held, each in its place; and the alkali cannot be affected by atmospheric moisture or $CO_2$. When the replacement is wanted the container is opened and the assemblage taken therefrom is ready for use.

In Fig. 2 is shown a partial view of the replacement in use, container 16 having been removed and assemblage placed in the jar 23. It will be noted that the axial rod 2 now passes through the jar or cell cover 17, being locked in place by nuts 18, which may be adjusted to lower the elements, to maintain the level of the electrolyte constant, in relation to the carbon element of the cell. The caustic soda has gone into solution to form electrolyte 19, covered at the top by the floating oil layer 20.

In Fig. 3 there is shown a modified form of 35 caustic alkali cake 1 which is molded in and around the zinc electrode 10. My molding the caustic around the zinc electrode in this fashion there is some saving in the height of the finished cell as well as of the replacement unit. The latter is cheaper to construct in this manner. The cake of caustic is firmly held by the zinc electrode in this modification, the contour of the caustic closely conforming to that of the electrode.

In putting the described replacement unit in operation the best results are obtained by placing the unit in the water which is to form the electrolyte, to a height just above the top of the caustic alkali cake. This allows a better diffusion of the electrolyte and a quicker melting or dissolving of the cake of soda. After the caustic alkali has become entirely dissolved, the replacement unit can be adjusted to its proper height in the electrolyte solution by means of the adjusting nuts 18 shown in Fig. 2.

Various modifications may be made in the invention as described without departing from the scope thereof. It is sometimes advantageous, for example, to employ a sealed unit which can be used as a completed cell immediately after breaking the seal and filling with water. In this case a cover may be provided just above the nuts 5 (Fig. 1) with one opening for the lead 11 and another serving for the introduction of water into the cell. Or a separate cover such as 17 (Fig. 2) may be provided to fit over the top of the container 16, which is then usually made of hard rubber or the like. Other modifications which fall within the scope of the following claims will be immediately evident to those skilled in the art.

What we claim is:

1. An electrolytic cell comprising an upper, flat faced, discoid depolarizing electrode, the upper face being adapted to be exposed to the air, the lower face being adapted to make contact with the electrolyte, a cylindrical metal sheath surrounding the electrode preventing access of electrolyte to the sides of the electrode while permitting access of electrolyte to the lower face, a cover on the sheath having a corkable orifice adapted to allow access of air to the upper face of the electrode, a lower, annular zinc electrode, and means for supporting the two electrodes, the cover and the sheath in compact, spaced relationship.

2. The structure of claim 1, wherein the supporting means comprise a central rod attached to the flat cover, and means for suspending the zinc electrode from the sheath.

3. The structure of claim 1, wherein the supporting means comprises a central rod, and a cake of alkali is carried on the rod below the depolarizing electrode.

4. The structure of claim 1, wherein a cake of alkali is carried by the annular zinc electrode.

5. The structure of claim 1, wherein a supply of oil is carried by the sheath.

6. As a new manufacture, a covered, hermetically sealed metal can having internal depressions centrally located in both cover and bottom, and a replacement unit for electric cells within the container, comprising a central, threaded rod extending within said container with its ends removably held in said depressions, a depolarizing electrode, a zinc electrode, and a cake of caustic soda rigidly held and supported by said threaded rod, the amount of caustic soda in said cake being sufficient to supply an alkaline electrolyte for a cell employing said depolarizing and said zinc electrodes, the container fitting closely around the replacement unit and serving to seal it from atmospheric moisture until it is removed for use in a cell.

7. The structure of claim 6 wherein a mass of absorbent material saturated with oil is likewise mounted on the assembled elements.

8. As a replacement unit for an alkaline cell, a central threaded rod, an open bottomed receptacle mounted on said rod, an activated carbon electrode within said receptacle supported by said rod and sealed to the side walls of said receptacle to leave an air space between the top of said receptacle and the said electrode, straps mounted on the outside of said receptacle supporting a zinc electrode, and a cake of caustic alkali supported on said threaded rod.

9. The structure of claim 8 wherein said zinc electrode is in the form of an annulus and said cake of caustic alkali is mounted within said electrode.

10. The structure of claim 8 wherein a mass of oil soaked absorbent material is mounted outside said receptacle.

11. The structure of claim 8 wherein the structure as a whole is mounted within an air tight container.

12. A renewal unit adapted for the renewal of primary cells of the alkaline type with utilization of the existing cell container and electrode supporting top, said renewal unit comprising in fixed assemblage an anode element, a cathode element, each of said elements having appropriate electrical connection, and a body of dry, soluble, hygroscopic, electrolyte-forming material, said elements and the said body being mounted in spaced unitary assemblage, a removable hermetically sealed temporary container enclosing the assemblage, including at least one of said electrical connections, the mounting of the electrode elements relative to each other being permanent and being of a nature adapting the mounted elements for direct attachment to the cover of the primary cell and the temporary container being merely large enough to contain the assemblage and not being adapted as a permanent cell container.

13. The structure of claim 12 wherein said cathode element is the copper-copper oxide electrode of a Lalande cell.

14. The structure of claim 12 wherein said cathode element is an air depolarized, activated carbon electrode.

15. The structure of claim 12 wherein a mass of absorbent material containing oil is also carried by said assemblage.

16. A replacement unit for electric cells of the alkaline type comprising a zinc electrode, a depolarizing electrode, electrical connections for said electrodes, a cake of caustic alkali, a supporting rod and means for mounting the electrodes and cake in rigid, spaced assemblage on said rod, a container surrounding the assemblage as a whole, including at least one of said electrical connections, and means in the bottom and in the top of said container for firmly holding the rod at each end, the container being hermetically sealed from the atmosphere to keep the assemblage in dry condition and being of a size merely sufficient to contain the stated elements.

17. The structure of claim 16 wherein the depolarizing electrode is the copper-copper oxide electrode of a Lalande cell.

18. The structure of claim 16 wherein said depolarizing electrode is an air depolarized, activated carbon electrode.

19. The structure of claim 16 wherein a mass of absorbent material containing oil is also carried by said assemblage.

MARTIN L. MARTUS.
EDMUND H. BECKER.